United States Patent
Kwok et al.

(10) Patent No.: US 11,533,654 B2
(45) Date of Patent: Dec. 20, 2022

(54) DATA PACKET PRIORITIZATION FOR DOWNLINK TRANSMISSION AT NETWORK LEVEL

(71) Applicant: T-Mobile USA, Inc., Bellevue, WA (US)

(72) Inventors: Ming Shan Kwok, Seattle, WA (US); Hsin-Fu Henry Chiang, Bellevue, WA (US); Alejandro Aguirre-Rivadeneyra, Sammamish, WA (US)

(73) Assignee: T-Mobile USA, Inc., Bellevue, WA (US)

(*) Notice: Subject to any disclaimer, the term of this patent is extended or adjusted under 35 U.S.C. 154(b) by 23 days.

(21) Appl. No.: 17/020,449

(22) Filed: Sep. 14, 2020

(65) Prior Publication Data

US 2022/0086680 A1    Mar. 17, 2022

(51) Int. Cl.
*H04W 28/02*    (2009.01)
*H04L 47/2425*    (2022.01)

(52) U.S. Cl.
CPC ..... *H04W 28/0268* (2013.01); *H04L 47/2433* (2013.01)

(58) Field of Classification Search
CPC ............. H04W 72/10; H04W 28/0205; H04W 28/0263; H04W 40/02; H04L 45/74
See application file for complete search history.

(56) References Cited

U.S. PATENT DOCUMENTS

| | | | |
|---|---|---|---|
| 9,480,101 B2 | 10/2016 | Dahod et al. | |
| 9,807,644 B2 | 10/2017 | Ma et al. | |
| 2016/0050653 A1* | 2/2016 | Rastogi | H04W 72/0486 455/453 |
| 2016/0135076 A1* | 5/2016 | Grinshpun | H04L 47/263 370/235 |
| 2016/0270104 A1 | 9/2016 | Zhu et al. | |
| 2018/0220327 A1* | 8/2018 | Karampatsis | H04W 28/0289 |
| 2019/0373503 A1 | 12/2019 | Maria | |

(Continued)

OTHER PUBLICATIONS

Office Action for U.S. Appl. No. 17/020,465, dated Jan. 5, 2022, Kwok, "Data Packet Prioritization for Downlink Transmission At Sender Level", 14 pages.

(Continued)

*Primary Examiner* — Omer S Mian
(74) *Attorney, Agent, or Firm* — Lee & Hayes, P.C.

(57) ABSTRACT

Techniques for network-based and sender-based data packet prioritization for downlink transmissions are discussed herein. Packets can be tagged or associated with information indicative of a priority of the packet for downlink transmission to a user equipment (UE). A priority level can be determined based on an application identifier or type associated with a data request, a level of user interaction with the UE, network conditions, and other factors. Packets can be received by a PDCP layer of a base station for sending based on the priority. Packets may be associated with a primary priority level associated with a QCI level and a secondary priority level based on UE and/or network factors discussed herein. Packets associated with a same QCI may be prioritized to optimize transmission of downlink data associated with a single UE or between transmission of downlink data associated with a plurality of UEs.

16 Claims, 9 Drawing Sheets

(56) References Cited

U.S. PATENT DOCUMENTS

| | | |
|---|---|---|
| 2020/0119999 A1 | 4/2020 | Jacobson et al. |
| 2020/0413284 A1* | 12/2020 | Vargantwar ......... H04W 88/085 |
| 2021/0219207 A1* | 7/2021 | Nigam ................... H04L 69/22 |
| 2021/0392556 A1 | 12/2021 | Soma et al. |
| 2022/0086681 A1 | 3/2022 | Kwok et al. |

OTHER PUBLICATIONS

Office Action for U.S. Appl. No. 17/020,465, dated Apr. 27, 2022, Kwok, "Data Packet Prioritization for Downlink Transmission At Sender Level", 19 Pages.

* cited by examiner

DATA PACKET PRIORITIZATION FOR DOWNLINK TRANSMISSION AT NETWORK LEVEL

BACKGROUND

Cellular communication devices use network radio access technologies to communicate wirelessly with geographically distributed cellular base stations. Long-Term Evolution (LTE) is an example of a widely implemented radio access technology that is used in 4th-Generation (4G) communication systems. New Radio (NR) is a newer radio access technology that is used in 5th-Generation (5G) communication systems. Standards for LTE and NR radio access technologies have been developed by the 3rd Generation Partnership Project (3GPP) for use by wireless communication carriers.

Mobile devices and base stations have radio protocol stacks that handle details of wireless data transmissions for standalone and dual connectivity communications. For example, data may be provided by an application, packetized to create data packets, and further processed by various layers of the radio protocol stack before being transmitted wirelessly as uplink data. Similarly, data may be provided by a data source to a base station as packetized data and transmitted to mobile devices as downlink data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
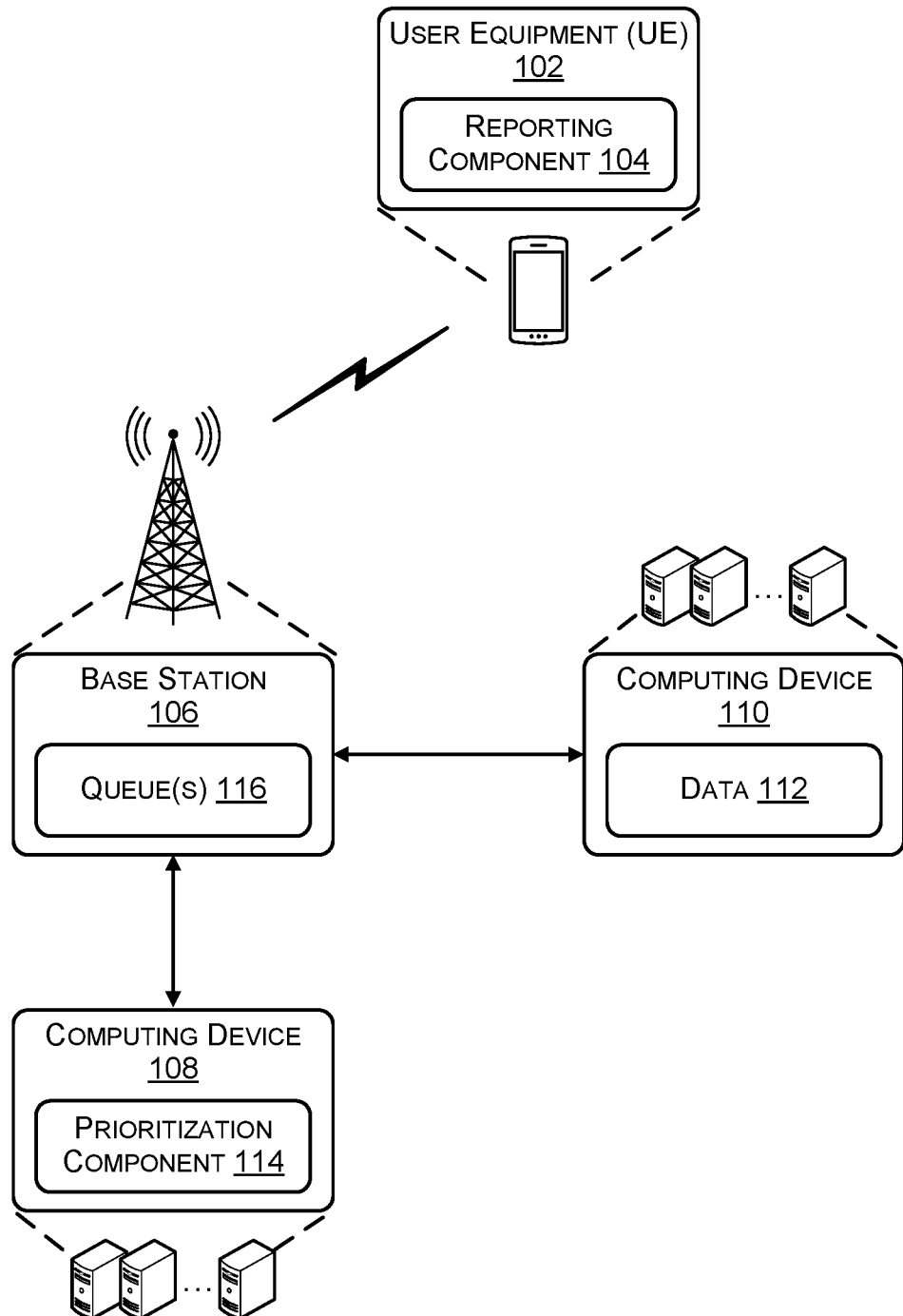
FIG. 1 shows an example network environment in which a user equipment (UE) can connect to a telecommunication network to receive downlink data prioritized in accordance with the techniques discussed herein.

Techniques for network-based and sender-based data packet prioritization for downlink transmissions are discussed herein. For example, Internet Protocol (IP) data packets can be tagged or otherwise associated with information indicative of a priority of the data packet for downlink transmission to a user equipment (UE). The data packets can be received by a Packet Data Convergence Protocol (PDCP) layer of a base station for queuing and/or transmission to other layers of a radio protocol stack based on a designated priority. In some examples, a packet may be associated with a primary priority level associated with a Quality of Service (QoS) Class Identifier (QCI) level and a secondary priority level based on factors discussed herein. Packets associated with a same QCI may be prioritized to optimize transmission of downlink data associated with a single UE or between transmission of downlink data associated with a plurality of UEs.

The data packet prioritization can be based on attributes associated with a UE. For example, a priority level can be based on a type of data traffic, such as web browsing, streaming (e.g., videos, music, etc.), gaming, and the like. In some examples, a priority level can be based at least in part on an application identifier associated with a data request. For example, a UE can transmit a data request to a data source, whereby the data request comprises an application identifier associated with the data request. The data request can be analyzed to determine the application identifier associated with the data request and packets provided in response to the request can be prioritized based on the application identifier.

In some examples, prioritization factors can include, but are not limited to, an application identifier, an indication of whether the application is in a foreground of a display or a background of a display, a destination IP address associated with a data request, a subscriber level associated with a UE or a user profile, deep packet inspection to determine packet type, location data of the UE, UE device type data, user preferences, power characteristics (e.g., battery power level) associated with the UE, aggregated user data or historical data, and the like. Prioritization factors can further include a QCI level associated with a data request, an amount of data traffic and/or congestion (e.g., relative to a data traffic level or a congestion level) associated with one or more base stations, base station characteristics (e.g., an availability of a Fifth Generation (5G) New Radio (NR) base station, an availability of a Fourth Generation (4G) Long-Term Evolution (LTE) base station), and the like.

In some examples, data associated with a data request can be received by a computing device comprising a model to determine a priority level associated with data packets. For example, the computing device can comprise a machine learned model that is trained to determine a priority level associated with data packets in response to a data request and based on prioritization factors, as discussed herein. In some examples, a UE can include a model (e.g., a machine learned model) and can provide an indication of a determined priority level associated with a data request to a base station and/or to a data source. Data packets can be tagged or otherwise associated with the priority level in a network-based implementation and/or in a sender-based implementation.

In a network-based implementation of the prioritization techniques discussed herein, the machine learned model can determine a priority level and provide an indication of the priority level to a PDCP layer of a base station. When the PDCP layer receives data packets in response to a data request from a UE, the PDCP layer can tag or otherwise associate the data packets with the priority level for downlink transmission to the UE. The PDCP layer can provide the packets to other layers of a radio protocol stack, such as a Radio Link Control (RLC) layer, a Medium Access Control (MAC) layer, and a Physical (PHY) layer for transmission to a UE. In some examples, the PDCP layer can provide packets to another PDCP layer of another base station (e.g., in a dual connectivity context).

In a sender-based implementation of the prioritization techniques discussed herein, the machine learned model can determine a priority level and provide an indication of the priority level to a data source associated with the data request. For example, a UE can send a data request to a data source. A prioritization model (e.g., a model such as a machine learned model at the UE, a computing device, a base station, or the data source) can determine a priority level for packets associated with the data request and can provide an indication of the priority level to the data source. The data source can tag or otherwise associate the data packets with the priority level and can send the tagged data packets to a base station for transmission to the UE in accordance with the priority level. The tagged data packets may be received by a PDCP layer of a base station and can be provided to other layers of the radio protocol stack (or another PDCP layer of another base station) for transmission to the UE.

In some examples, the prioritization techniques discussed herein may be treated as a preference or priority, rather than an unbreakable rule. Other factors, for example, might affect the routing of a data packet, such as signal availability, buffer capacity, the current performance of a base station, the priority of other UEs and/or data packets to be sent, an amount of time a data packet has been in a transmission queue, and so forth.

As noted above, in some examples, the priority level may be associated with data packets as a packet tag. In some examples, the PDCP layer may compare the packet tags of a data packet to a preconfigured policy that specifies relative priorities for different applications and customers. Data packets from high-priority sources may then be given preference in buffer overflow conditions. Specifically, although some queued data packets may time out and be discarded to prevent buffer overflow, preferred or prioritized packets may be retained in transmission queues regardless of timeout parameters. In some examples, data can be associated with various queues associated with a PCDP layer, as discussed herein.

In some examples, a transmission of packets to a UE can be based on the packet tags in the absence of congestion or buffer overflow conditions. For example, the packet tags can be used to prioritize data associated with a same UE to optimize downlink traffic to the UE without regard to downlink traffic associated with other UEs.

In some cases, a packet tag can indicate whether the packet should be transmitted using an LTE connection or an NR connection of a Non-Standalone (NSA) architecture or other dual connectivity session. In some implementations, this determination may be based on a policy that has been preconfigured to specify either LTE or NR transmission for different applications and/or customers. The policy may be based on needs of different applications and the different characteristics of LTE and NR communications. In some systems, LTE may be considered to provide higher reliability than NR, as an example. Similarly, NR may be considered to provide higher bandwidth and lower latency than LTE. In some systems, data packets from applications that may need high reliability, such as email applications, may be transmitted using LTE. Data packets associated with applications such as gaming applications, for example, which may need low latency, may be transmitted using NR. Applications needing high throughput, such as video applications, may be also be transmitted using NR.

The techniques discussed herein can be used to implement intra-UE prioritization and/or inter-UE prioritization. In some instances, intra-UE prioritization can be used to prioritize downlink transmissions among transmissions associated with a single UE while inter-UE prioritization can be used to prioritize downlink transmissions among various UEs. By way of example and without limitation, for a UE requesting first data associated with a gaming application, second data associated with a streaming music application, and third data associated with a file download, requests associated with each of the data may be associated with a same QCI. However, a model such as a machine learned component can receive prioritization factors associated with the UE and can prioritize packets associated with the first, second and third data packets, respectively, to provide a high Quality of Experience (QoE) to a user. For example, the gaming application may be in the foreground of a display of the UE, which may contribute to a high priority of packets associated with the first data. In some cases, the second data associated with streaming music may have a higher priority than the third data, while in some examples, the third data associated with a file download may be prioritized above the second data to minimize an amount of time to download the file. The priority levels can be determined based on UE attributes, network attributes, user preferences, and the like, as discussed herein.

The described techniques enhance network functionality and user experience by customizing the transmission of data to provide the most appropriate performance characteristics for any particular application or customer.

The techniques discussed herein can be implemented in the context of protocols associated with one or more of 3G, 4G, 4G LTE, and/or 5G protocols. In some examples, the network implementations can support standalone architectures, non-standalone architectures, dual connectivity, carrier aggregation, etc. Example implementations are provided below with reference to the following figures.

FIG. 1 shows an example network environment 100 in which a user equipment (UE) 102 can connect to a telecommunication network to receive downlink data prioritized in accordance with the techniques discussed herein. The UE 102 can be any device that can wirelessly connect to the telecommunication network. In some examples, the UE 102 can be a mobile phone, such as a smart phone or other cellular phone. In other examples, the UE 102 can be a personal digital assistant (PDA), a media player, a tablet computer, a gaming device, a smart watch, a hotspot, a personal computer (PC) such as a laptop, desktop, or workstation, or any other type of computing or communication device.

The UE 102 can include a reporting component 104 that can determine attributes associated with the UE can that be used to determine a priority level associated a data request. In some examples, the reporting component 104 can determine a priority level associated with a data request and can include an indication of that priority level to be provided to a computing device such as a base station 106, a computing device 108, and/or a computing device 110. In general, the reporting component 104 can gather or otherwise determine attributes of the UE 102, such as an application identifier, user behavior, a state of the UE, indication(s) of user preferences (e.g., express via a user interface or implied via observed/learned behavior), and the like. In some examples, the reporting component 104 may include heuristics, policies, rules, and/or models (e.g., machine learned models) to determine a priority level associated with a data request. In some examples, the reporting component 104 may gather or otherwise determine attributes associated with the UE 102 and provide such attributes to other devices, as discussed herein. Additional details of the UE 102 and the reporting component 104 are discussed in FIG. 2, as well as throughout this disclosure.

The telecommunication network can have one or more access networks that include base stations (e.g., the base station 106) and/or other access points, as well as a core network linked to the access network. The access networks and/or the core network can be compatible with one or more radio access technologies, wireless access technologies, protocols, and/or standards, such as 5G NR technology, LTE/LTE Advanced technology, other Fourth Generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMAX technology, Wi-Fi technology, and/or any other previous or future generation of radio access technology.

The UE 102 can wirelessly connect to the base station 106 and can send data requests to a data source, such as the computing device 110 comprising data 112. In conjunction with or based at least in part on a data request, the UE 102 can send attribute data and/or priority data to the computing device 108 (e.g., in a case where a prioritization component 114 is implemented in the computing device 108) or to another device comprising the prioritization component 114. In some examples, the base station 106 can receive at least a portion of the data 112 as packetized data. In the case of the network-based prioritization of downlink data transmission, the base station 106 can tag or otherwise associate a priority level with data packets received from the computing device 110. In the case of a sender-based prioritization of downlink data transmission, the computing device 110 can tag or otherwise associate a priority level with data packets to be sent to the base station 106.

The base station 106 can include queue(s) 116, whereby data received by the base station 106 can be input to the queue(s) 116 for transmission to the UE 102. In some examples, the queue(s) 116 can be associated with a PDCP layer of a radio protocol stack. In some examples, the queue(s) 116 can include a plurality of queues with different destinations, priority levels, sizes, delay characteristics, packet error loss rates, and the like. In some examples, the queue(s) 116 can individual queues associated with specific data bearers, such as a dedicated bearer, a default bearer, and the like. In some examples, data input to a queue of the queue(s) 116 may be transmitted in a first-in first-out (FIFO) manner. However, in some examples, data can be added to a queue based on a priority level associated with such data and/or data can be reordered or transmitted from the queue based on the priority level, thereby deviating somewhat from the FIFO transmission scheme. Additional discussion of queues is provided in connection with FIG. 4, as well as throughout this disclosure.

In some examples, the base station 106 can be implemented in the context of an LTE access network known as an Evolved UMTS Terrestrial Radio Access Network (E-UTRAN). Base stations of the LTE access network can be known as eNBs. The base station 106 can also be implemented in the context of 5G access network with base stations known as gNBs. In some examples, the base station 106 can represent an eNB and a gNB located at a same cell site. In other examples, the base station 106 can represent an eNB and a gNB located at different cell sites.

The base station 106 can be implemented to support dual connectivity between the UE 102 and multiple base stations in an access network. For example, the UE 102 can establish an LTE connection with an eNB and a 5G connection with an gNB, where such a connection can be referred to as an E-UTRAN New Radio-Dual Connectivity (EN-DC) connection. An EN-DC connection may be based on a 3GPP EN-DC configuration, such as an "option 3x" EN-DC configuration, "option 3" EN-DC configuration, "option 3a" EN-DC configuration, or other EN-DC configuration.

The UE 102 may connect to a core network via one or more bearers. Bearers can be virtual channels used to transport data for the UE 102 between network elements. For example, a data radio bearer may be established between the base station 106 and the UE 102. When the techniques are implemented in an intra-UE context, data packets can be prioritized with respect to a single bearer (or with respect to multiple bearers in the context of dual connectivity) associated with a single UE. In such cases, a single UE can be associated with a single queue of the queue(s) 116. When techniques are implemented in an intra-UE context, the queue(s) 116 can be associated with multiple UEs such that prioritizing data packets may prioritize data packets for a first UE over a second UE that is different than the first UE.

Figure 2:
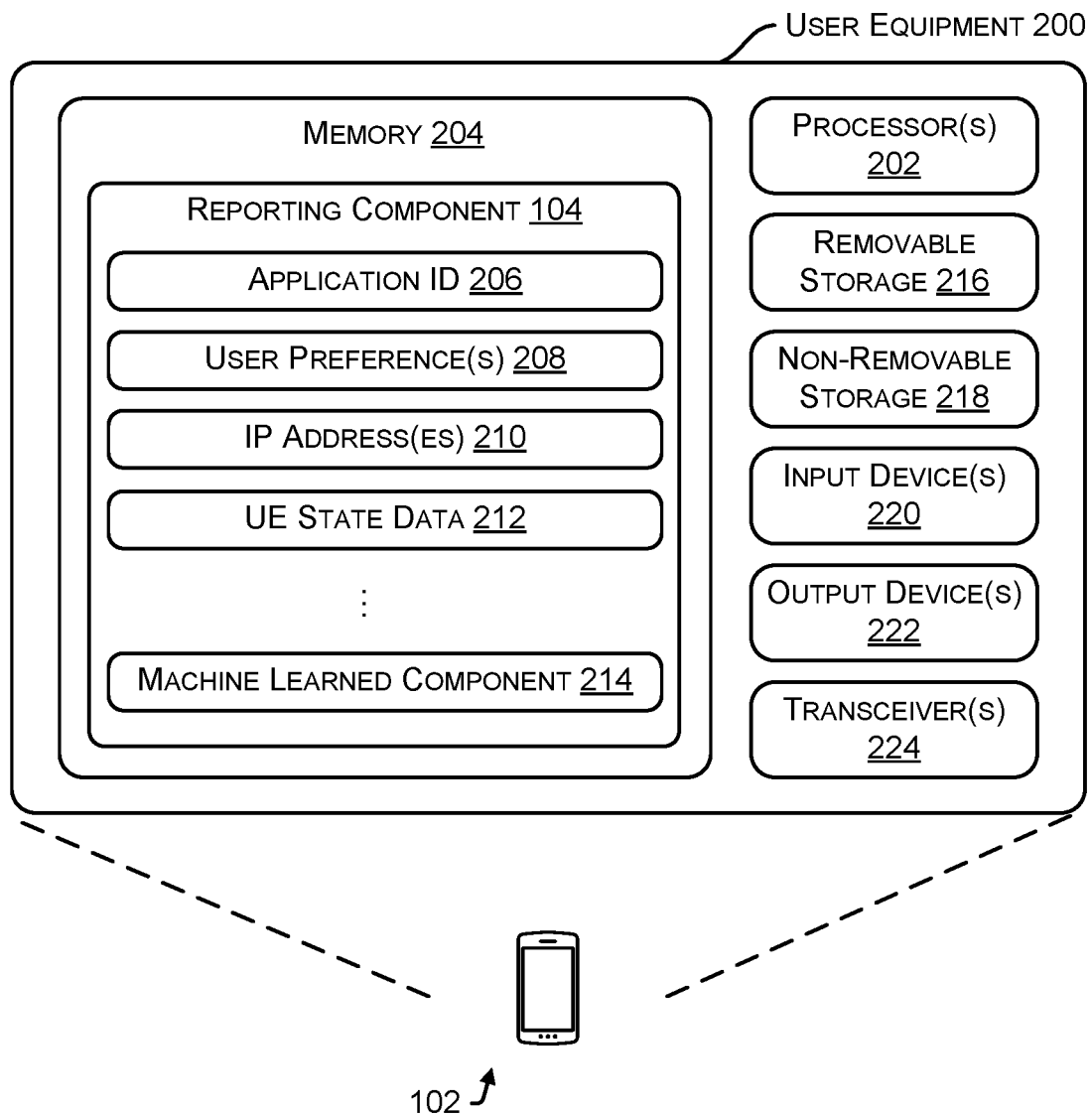
FIG. 2 is a block diagram of a UE including components for determining attributes for prioritizing downlink data.

FIG. 2 is a block diagram of a UE 200 including components for determining attributes for prioritizing downlink data. In some examples, the UE 200 (also referred to as a device 200) can be configured to implement some or all of the techniques discussed herein.

FIG. 2 shows basic, high-level components of the device 200. Generally, the device 200 may comprise and/or may be implemented in any of various network components discussed herein, including those components illustrated in FIG. 1.

In various examples, the device 200 may include processor(s) 202 and memory 204. Depending on the exact configuration and type of computing device, the memory 204 may be volatile (such as RAM), non-volatile (such as ROM, flash memory, etc.) or some combination of the two. The memory 204 may include the reporting component 104, which may include an application ID 206, user preference(s) 208, IP address(es) 210, and/or UE state data 212, and a machine learned component 214.

In some examples, the reporting component 104 can include functionality to gather or otherwise determine data about the UE and to report the data to another computing device (e.g., the base station 106 or the computing devices 108 or 110) or to report a determined priority level associated with one or more data requests. In some examples, a destination of data or a priority level can be based at least in part on whether the techniques are implemented as network-based or sender-based prioritization, and/or where a priority level is determined (e.g., at a UE, at a computing device, etc.).

The reporting component 104 can determine information about an application identifier, user preferences, IP addresses, UE state data, and/or machine learned data or priority levels. In some examples, the reporting component 104 can report or determine information associated with each data request as it is sent from the UE 200 to a data source. In some examples, the reporting component 104 can report data or determine a priority level on any regular or irregular intervals or in response to a request from a remote device.

In some examples, the application ID 206 (also referred to as an application identifier) can include data indicative of a type of application being executed by the UE. For example, data about the application type may indicate that the application is a video streaming application, a web browser, a social media application, or any other type or class of application. In some examples, data about the application type may directly identify the specific application being executed by the UE, via an application name, process name, or other unique identifier.

The application ID 206 may in some cases indicate the particular application that generated the data of a data packet or a data request. In some instances, different application identifiers may correspond respectively to specific applications. Alternatively, application identifiers may correspond to application types, such as video, audio, email, chat, industrial control, etc. An application identifier may also correspond to a server application to which the data packet is destined.

In further examples, the reporting component 104 can determine and report a user ID (identifier) that can indicate or correspond to a customer or user profile, such as an individual or organization using the device 200 or to whom the device 200 belongs. As another example, a user ID may indicate or correspond to a particular customer account with which the device 200 is associated. As yet another example, a user ID may indicate or correspond to a provider of services with which a data packet is associated.

In some examples, the user preference(s) 208 can include data indicative of one more express or inferred user preferences. For example, the user preference(s) 208 may indicate settings received by the device 200 (e.g., via a user interface) comprising express priority indication(s), such as prioritizing a first application over a second application, or for prioritizing a first application type (e.g., gaming) over a second application type (e.g., streaming or downloading). In some examples, the user preference(s) 208 may indicate behaviors of a user over time, such as data indicating that a file that is downloaded is not consumed (e.g., viewed, played, installed, etc.) until some time after the download is complete. In some examples, the user preference(s) 208 can indicate a time period for which a software update is scheduled, which may help determine a priority level associated with downloading such a software update. In some examples, the user preference(s) 208 may indicate a frequency of checking a download status for a file, which may indicate a level of interest in the file, and which may accordingly be used to determine, in part, a priority level associated with a file download.

In some examples, the reporting component 104 may receive an indication of congestion at a network level and may present an ability for a user to prioritize data requests for different applications. Accordingly, the user preference(s) 208 may represent preferences that are associated with a particular time period, after which the user preferences may be weighted more or less when determining a priority of downlink data associated with a data request.

In some examples, the IP (Internet Protocol) address(es) 210 can include data indicative of a destination IP address associated with a data request and/or an IP address associated with a source of data in response to the data request. In some examples, an IP address associated with a particular data request may be associated with a higher priority level or a lower priority level. In some examples, an IP address may be associated with a preferred list of IP addresses, which may result in or may be associated with a higher priority level. In some examples, a preferred list of IP addresses may be defined by a user or provided by a computing device. In some examples, the IP address(es) 210 can be associated with one or more domain names (or a fully qualified domain name (FQDN)) for ease of review by a user.

In some examples, the UE state data 212 can include data representing one or more conditions at the UE. In some examples, the UE state data 212 can represent data about a display status of the UE, sensor data from the UE, an indication that the UE is associated with a low power mode, an amount of power in a battery associated with the UE, a charge state indication associated with the UE, as well as other factors. The UE state data 212 can be input or otherwise provided to the machine learned component 214 (or another model or machine learned component discussed herein) to determine a priority level associated with a data request.

In some examples, the data about a display status of the UE may indicate that a display is active or inactive, such as whether the display is turned on and/or displaying images, or is turned off and/or not displaying images. In some examples, data about a display status may indicate whether the display of the UE is in active use by a user. For example, if the display is a touch-sensitive screen, data about the display status may indicate whether touch inputs are being received from a user. In some examples, the data about a display status of the UE can further indicate which application(s) are in a foreground of the display and which application(s) are in a background of the display. In some examples, data indicative of a high level of interaction with an application and a display can increase a priority of data associated with the application, while data indicative of a low level of interaction with an application or a display can decrease a priority of data associated with the application.

In some examples, the sensor data from the UE can include information from cameras, sensors, and/or other input devices of the UE. In some examples, input devices of the UE may include a front-facing camera, infrared sensor, light sensor, proximity sensor, and/or other sensors. Sensor data may include data captured by such sensors, or data derived from the data captured by the sensors. For example, an operating system or an application of the UE can be configured to use data captured by front-facing sensors to perform facial recognition, detect when a face of a user is oriented toward the display of the UE, and/or when eyes of the user are looking at the display. In some examples, data indicative of an identified user or of a user facing a display can increase a priority level of downlink data associated with one or more applications, while data not indicative of those factors can decrease a priority level associated with such downlink data.

In some examples, the machine learned component 214 can include one or more machine learned models or heuristics that can be used to determine a priority level of downlink data associated with a data request. For example, the machine learned component 214 can include weight(s) for various factors that can be used to set priority level(s) or likelihoods and/or determine factors that increase or decrease a priority level, and by how much.

As noted above, a data request may be associated with an application ID 206, as well as other data. In some examples, the machine learned component 214 can be configured with a predefined list of applications and/or types of application, along with corresponding indications of priority levels (or relative priority levels) associated with specific applications or types of applications. Accordingly, in such examples, the machine learned component 214 can use information about the application type to find a corresponding entry on the predetermined list, and determine if the application is associated with a predefined priority level for downlink data transmission.

In some examples, the machine learned component 214 can be configured to weight different factors more heavily than other factors, and/or consider different factors in different orders. For example, if an application ID 206 indicates that a first priority level associated with downlink data, the machine learned component 214 can be configured to weight that factor more heavily than data indicative of a display status of the UE or whether the application is in a foreground or background of the display. Further, the machine learned component 214 may receive an indication of a user preference 208 associated with a data request but may also determine a relative priority based on a device type, a user ID, a subscription type, roaming status, and the like. In some examples, the machine learned component 214 can receive indications regarding whether a user experience was positive (e.g., a data prioritization was correct from the perspective of a user) or was negative (e.g., a data prioritization was incorrect from the perspective of a user) and may adjust parameters and/or weights over time to arrive at an optimal model for a user or a plurality of users.

In some examples, the processor(s) 202 is a central processing unit (CPU), a graphics processing unit (GPU), both CPU and GPU, or other processing unit or component known in the art. Furthermore, the processor(s) 202 may include any number of processors and/or processing cores. The processor(s) 202 is configured to retrieve and execute instructions from the memory 204.

The memory 204 can also be described as non-transitory computer-readable media or machine-readable storage memory, and may include removable and non-removable media implemented in any method or technology for storage of information, such as computer executable instructions, data structures, program modules, or other data.

The memory 204 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information.

The device 200 also includes additional data storage devices (removable and/or non-removable) such as, for example, magnetic disks, optical disks, or tape. Such additional storage is illustrated in FIG. 2 by removable storage 216 and non-removable storage 218. Tangible computer-readable media can include volatile and non-volatile, removable and non-removable media implemented in any method or technology for storage of information, such as computer readable instructions, data structures, program modules, or other data. The memory 204, the removable storage 216 and the non-removable storage 218 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the device 200. Any such tangible computer-readable media can be part of the device 200.

The memory 204, the removable storage 216, and/or the non-removable storage 218 may in some cases include storage media used to transfer or distribute instructions, applications, and/or data. In some cases, the memory 204, the removable storage 216, and/or the non-removable storage 218 may include data storage that is accessed remotely, such as network-attached storage that the device 200 accesses over some type of data communications network.

In various examples, any or all of the memory 204, the removable storage 216, and/or the non-removable storage 218 may store programming instructions that, when executed, implement some or all of the function functionality described herein.

The device 200 also can include input device(s) 220, such as a keypad, a cursor control, a touch-sensitive display, voice input device, etc., and output device(s) 222 such as a display, speakers, printers, etc. These devices are well known in the art and need not be discussed at length here.

As illustrated in FIG. 2, the device 200 also includes one or more wired or wireless transceiver(s) 224. For example, the transceiver(s) 224 can include a network interface card (NIC), a network adapter, a LAN adapter, or a physical, virtual, or logical address to connect to various networks, devices, or components illustrated in figures herein. To increase throughput when exchanging wireless data, the transceiver(s) 224 can utilize multiple-input/multiple-output (MIMO) technology. The transceiver(s) 224 can comprise any sort of wireless transceivers capable of engaging in wireless, radio frequency (RF) communication. The transceiver(s) 224 can also include other wireless modems, such as a modem for engaging in Wi-Fi, WiMAX, Bluetooth, infrared communication, and the like.

Figure 3:
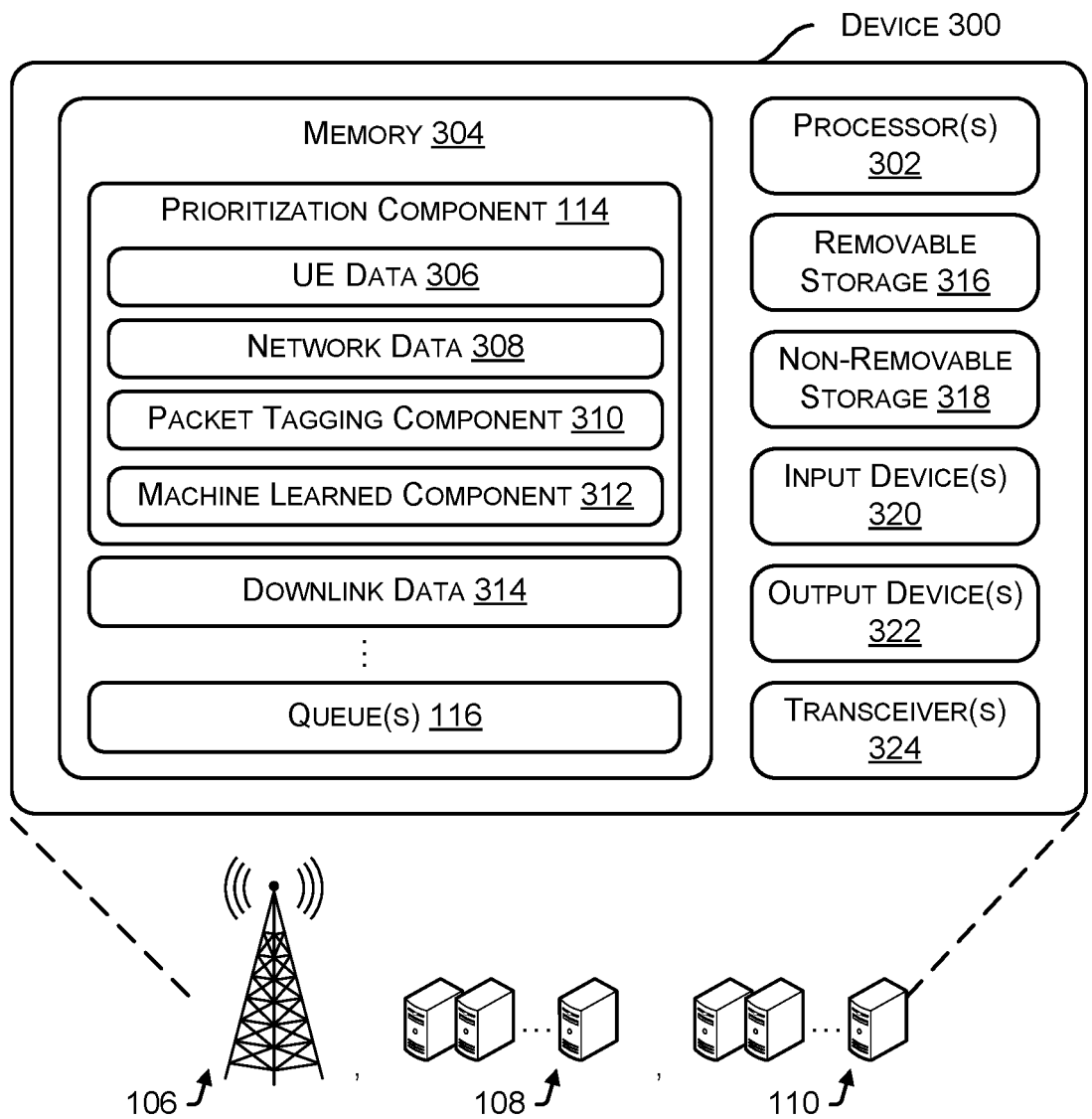
FIG. 3 is a block diagram of a device including components for prioritizing downlink data for a UE based on various factors.

FIG. 3 is a block diagram of a device 300 including components for prioritizing downlink data for a UE based on various factors. In some examples, the device 300 can be configured to implement some or all of the techniques discussed herein.

FIG. 3 shows basic, high-level components of the device 300. Generally, the device 300 may comprise and/or may be implemented in any of various network components discussed herein, including those components illustrated in FIGS. 1 and 2.

In various examples, the device 300 may include processor(s) 302 and memory 304. Depending on the exact configuration and type of computing device, the memory 304 may be volatile (such as RAM), non-volatile (such as ROM, flash memory, etc.) or some combination of the two. The memory 304 may include the prioritization component 114, which may include UE data 306, network data 308, a packet tagging component 310, and a machine learned component 312. The memory 304 may further include downlink data 314, and/or queues 116.

In some examples, the prioritization component 114 can include functionality to determine a priority level for data packet(s) associated with a data request for a UE. In some examples, the prioritization component 114 may determine a secondary priority level associated with a packet, whereby a primary priority is determined by a QCI level associated with a data request. That is, in some case, the prioritization component 114 can prioritize packets associated with a same QCI to optimize transmission of downlink data associated with a single UE or between transmission of downlink data associated with a plurality of UEs. The prioritization component 114 can determine a priority level based at least in part on the UE data 306, the network data 308, the packet tagging component 310, the machine learned component 312, the downlink data 314, and/or the queue(s) 116.

Further, the prioritization component 114 can perform deep packet inspection on at least a payload portion of a packet to determine an application type, an application identifier, source/destination IP addresses, and the like, associated with such packets, whereby the prioritization component 114 can determine a priority level based at least in part on deep packet inspection of downlink data (and/or of a data request) associated with a UE.

In some examples, the prioritization component 114 can increase or decrease a priority level from an initial priority level or a default level associated with a QCI level associated with a data request. For example, a data packet may be associated with a priority level based on a QCI associated with the data packet. As noted herein, in some examples, the prioritization component 114 can determine a secondary priority level to be considered in addition to a default priority level based on a QCI. In this manner, data packets may be prioritized with respect to other data packets associated with a same QCI. In other examples, the prioritization component 114 can update or determine a priority level that overrides a default priority level associated with a QCI. In some examples, the data packet with a priority level can be received by a PDCP layer, which can override a default priority level associated with the QCI based on the priority level as determined by the prioritization component 114.

In some examples, the UE data 306 can include data received from the reporting component 104 associated with the UE 102. For example, the UE data 306 can comprise the application ID 206, the user preference(s) 208, the IP address(es) 210, the UE state data 212, and/or any priority levels as determined by the machine learned component 214. In some examples, individual instances of the UE data 306 can be associated with each data request to reflect a changing state of the UE over time.

In some examples, the network data 308 can include data associated with a state of a network or data based on aggregated data over time. For example, the network data 308 can include data about base station(s) associated with geographical areas, base station capabilities (e.g., LTE/NR capable), network bandwidth availability, delay times, packet error rates, etc. In some examples, a priority level can be set by the prioritization component 114 to ensure a downlink data rate, to ensure that packets are delivered within an associated delay budget, and/or to ensure that packets are delivered within a threshold amount of an associated packet error loss rate.

In some examples, the network data 308 can include data indicative of priority levels associated with individual applications or data sources. In some examples, the priority level can be based on an aggregated level of popularity of applications across a plurality of user devices. For example, if an application, such as a gaming application, is currently popular (e.g., usage is above a threshold level for a threshold level of user devices), the network data 308 can indicate that a priority level of such data can be increased or decreased, depending on specific goals. In some examples a priority level of downlink data associated with an application can change over time as applications increase and decrease in popularity.

In some examples, the packet tagging component 310 can include functionality to tag packets or to associate packets with a determined priority level for downlink data transmission. In some examples, a packet tag may be embedded in a payload of the data packet or in another field (e.g., a header portion) of the data packet. In other examples, such a packet tag may be associated with the data packet in some other way, such as by routing the packet tag along with the data packet.

In some examples, the machine learned component 312 can include one or more machine learned models or heuristics that can be used to determine a priority level of downlink data associated with a data request. For example, the machine learned component 312 can include weight(s) for various factors that can be used to set priority level(s) or likelihoods and/or determine factors that increase or decrease a priority level, and by how much.

The machine learned component 312 may receive the UE data 306, the network data 308, as well as other data. Based at least in part on the UE data 306 and/or the network data 308, the machine learned component 312 can determine corresponding indications of priority levels (or relative priority levels) associated with data requests. In some examples, the machine learned component 312 can determine priority levels for data requests associated with a same QCI level, and in some examples, the priority levels may indicate relative priorities for a single UE or between multiple UEs.

In some examples, the machine learned component 312 can designate priority levels for packets to be sent via a particular NR base station or a particular LTE base station.

The machine learned component 312 can be configured to weight different factors more heavily than other factors, and/or consider different factors in different orders. For example, if the UE data 306 indicates that downlink data associated with a particular application has a first priority level but that the network data 308 indicates that the application is highly popular or has been associated with (in the aggregate) with a second priority level higher than the first priority level, the machine learned component 312 may weigh each factor when determining an ultimate priority level.

In some examples, the downlink data 314 can include data received from a data source to be sent to a UE via a downlink transmission. In some examples, the device 300 can include data pre-cached or stored in a location closer to an expected data request. For example, for a base station near a stadium, the downlink data 314 may include sports replays, data about local street traffic, or other transportation data. Thus, in some examples, the downlink data 314 can include data stored in an edge of a network to further reduce latency and to improve a Quality of Experience (QoE) for a user.

In some examples, the queue(s) 116 can include one or more transmission queues for transmitting downlink data to a UE. In some examples, the queue(s) 116 may be associated with a PDCP layer of a base station. The queue(s) 116 may transmit data in a first-in first-out manner, or may alter a transmission time and/or location within a queue based on the priority level discussed herein. Additional details of the queue(s) are discussed in the context of FIG. 4.

In some examples, the processor(s) 302 is a central processing unit (CPU), a graphics processing unit (GPU), both CPU and GPU, or other processing unit or component known in the art. Furthermore, the processor(s) 302 may include any number of processors and/or processing cores. The processor(s) 302 is configured to retrieve and execute instructions from the memory 304.

The memory 304 can also be described as non-transitory computer-readable media or machine-readable storage memory, and may include removable and non-removable media implemented in any method or technology for storage of information, such as computer executable instructions, data structures, program modules, or other data.

The memory 304 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information.

The device 300 also includes additional data storage devices (removable and/or non-removable) such as, for example, magnetic disks, optical disks, or tape. Such additional storage is illustrated in FIG. 3 by removable storage 316 and non-removable storage 318. Tangible computer-readable media can include volatile and non-volatile, removable and non-removable media implemented in any method or technology for storage of information, such as computer readable instructions, data structures, program modules, or other data. The memory 304, the removable storage 316 and the non-removable storage 318 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the device 300. Any such tangible computer-readable media can be part of the device 300.

The memory 304, the removable storage 316, and/or the non-removable storage 318 may in some cases include storage media used to transfer or distribute instructions, applications, and/or data. In some cases, the memory 304, the removable storage 316, and/or the non-removable storage 318 may include data storage that is accessed remotely, such as network-attached storage that the device 300 accesses over some type of data communications network.

In various examples, any or all of the memory 304, the removable storage 316, and/or the non-removable storage 318 may store programming instructions that, when executed, implement some or all of the function functionality described herein.

The device 300 also can include input device(s) 320, such as a keypad, a cursor control, a touch-sensitive display, voice input device, etc., and output device(s) 322 such as a display, speakers, printers, etc. These devices are well known in the art and need not be discussed at length here.

As illustrated in FIG. 3, the device 300 also includes one or more wired or wireless transceiver(s) 324. For example, the transceiver(s) 324 can include a network interface card (NIC), a network adapter, a LAN adapter, or a physical, virtual, or logical address to connect to various networks, devices, or components illustrated in figures herein. To increase throughput when exchanging wireless data, the transceiver(s) 324 can utilize multiple-input/multiple-output (MIMO) technology. The transceiver(s) 324 can comprise any sort of wireless transceivers capable of engaging in wireless, radio frequency (RF) communication. The transceiver(s) 324 can also include other wireless modems, such as a modem for engaging in Wi-Fi, WiMAX, Bluetooth, infrared communication, and the like.

Figure 4:
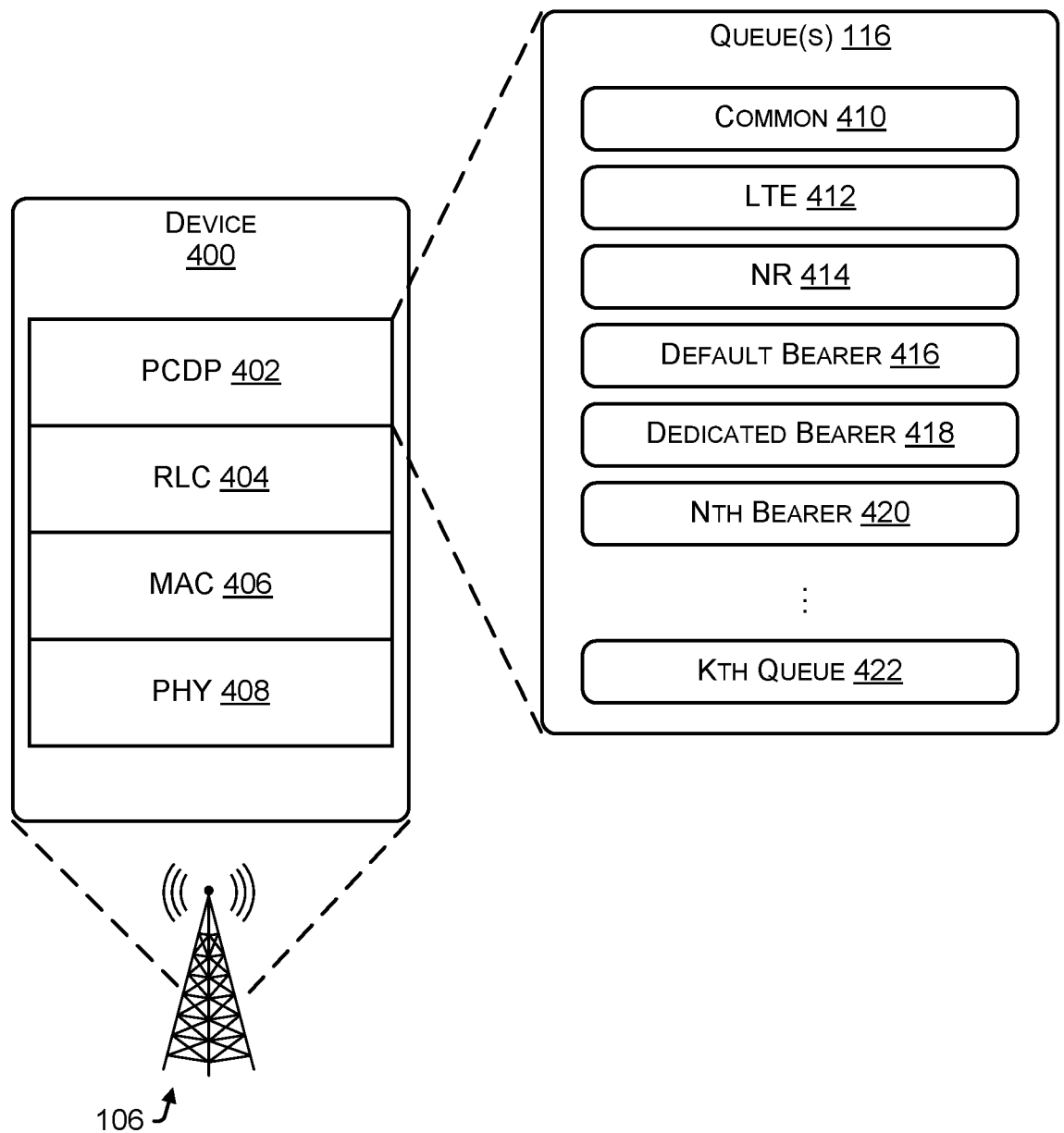
FIG. 4 is a block diagram of a device including various layers of a radio protocol stack including one or more queues for prioritizing downlink data.

FIG. 4 is a block diagram of a device 400 including various layers of a radio protocol stack including one or more queues for prioritizing downlink data.

The device 400 can include a Packet Data Convergence Protocol (PDCP) layer 402, a Radio Link Control (RLC) layer 404, a Media Access Control (MAC) layer 406, and a Physical (PHY) layer 408. In some examples, the PDCP layer 402 can include the queue(s) 116, which may include one or more of a common queue 410, an LTE queue 412, an NR queue 414, a default bearer queue 416, a dedicated bearer queue 418, an N-th bearer queue 420, and/or a K-th queue 422.

Although illustrated as part of the PDCP layer 402, the queue(s) 116 may be implemented as another component that is communicatively coupled with the PDCP layer 402.

In some examples, packets received by the PDCP layer 402, which would otherwise be queued in a single transmission queue corresponding to Internet data, are instead routed by the PDCP layer 402 into one of the queue(s) 116, depending on priority data and implementations.

In an example where the queue(s) 116 comprise the LTE queue 412 and the NR queue 414, data packets may be designated as an LTE data packet or as an NR data packet and assigned to the respective queue to be transmitted according to a priority level as discussed herein.

In some examples, data packet associated with a high priority can be input to the dedicated bearer queue 418 while data packets associated with a lower priority can be input to the default bearer queue 416. In some examples, any number of bearer queues can be implemented in the queue(s) 116, as illustrated by the Nth bearer queue 420. Similarly, the queue(s) 116 can include any number of queues, as illustrated by the Kth queue 422.

In some examples, data packets associated with a same QCI can be associated with a same queue while data within the queue can be transmitted in accordance with a priority level, as discussed herein. In some examples, data packets can be prioritized with respect to other data packets associated with a same destination UE, and in some examples, data packets can be prioritized with respect to other data packets associated with other designation UEs.

In some cases, data packets may be initially stored in a common packet queue 410 before being moved to one of the queues 410, 412, 414, 416, 418, 420, or 422. In some examples, there may only be one queue 410 whereby packets are input to the queue 410 based on a priority level or are reordered or removed from the queue 410 based on a priority level.

Data packets from the one of the queues 410, 412, 414, 416, 418, 420, or 422 are routed to the RLC layer 404 for subsequent processing by the MAC layer 406 and PHY layer 408 and transmission as downlink data.

In some examples, the device 400 can be implemented in a UE where the techniques may be applied to uplink data to be sent from the UE to a base station.

In an example where the queue(s) 116 include a high priority queue and a lower priority queue, the PDCP layer 402 may apply a timeout mechanism to the data packets of the lower priority queue so that data packets that have been in the lower priority queue for a predetermined amount of time without being transmitted are discarded. In some examples, the PDCP layer 402 does not apply the timeout mechanism to the data packets of the higher priority queue. Accordingly, data packets of the priority queue can be discarded as appropriate to manage queue overflow, while the data packets of the high priority queue are retained, regardless of how long they have been queued.

In an example where data packets associated with different priority levels are added to a single queue, packets with a higher priority can be reordered for transmission before packets associated with a lower priority.

In some examples, a priority of a packet can change based on an amount of time that a packet has been in a queue. For example, a priority can increase as an amount of time a packet has been in a queue increases. In some examples, a packet that has been in a queue for longer than a predetermined amount of time can be discarded.

FIGS. 5-9 illustrate example processes and sequence diagrams in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order, omitted, and/or performed in parallel to implement the processes.

Figure 5:
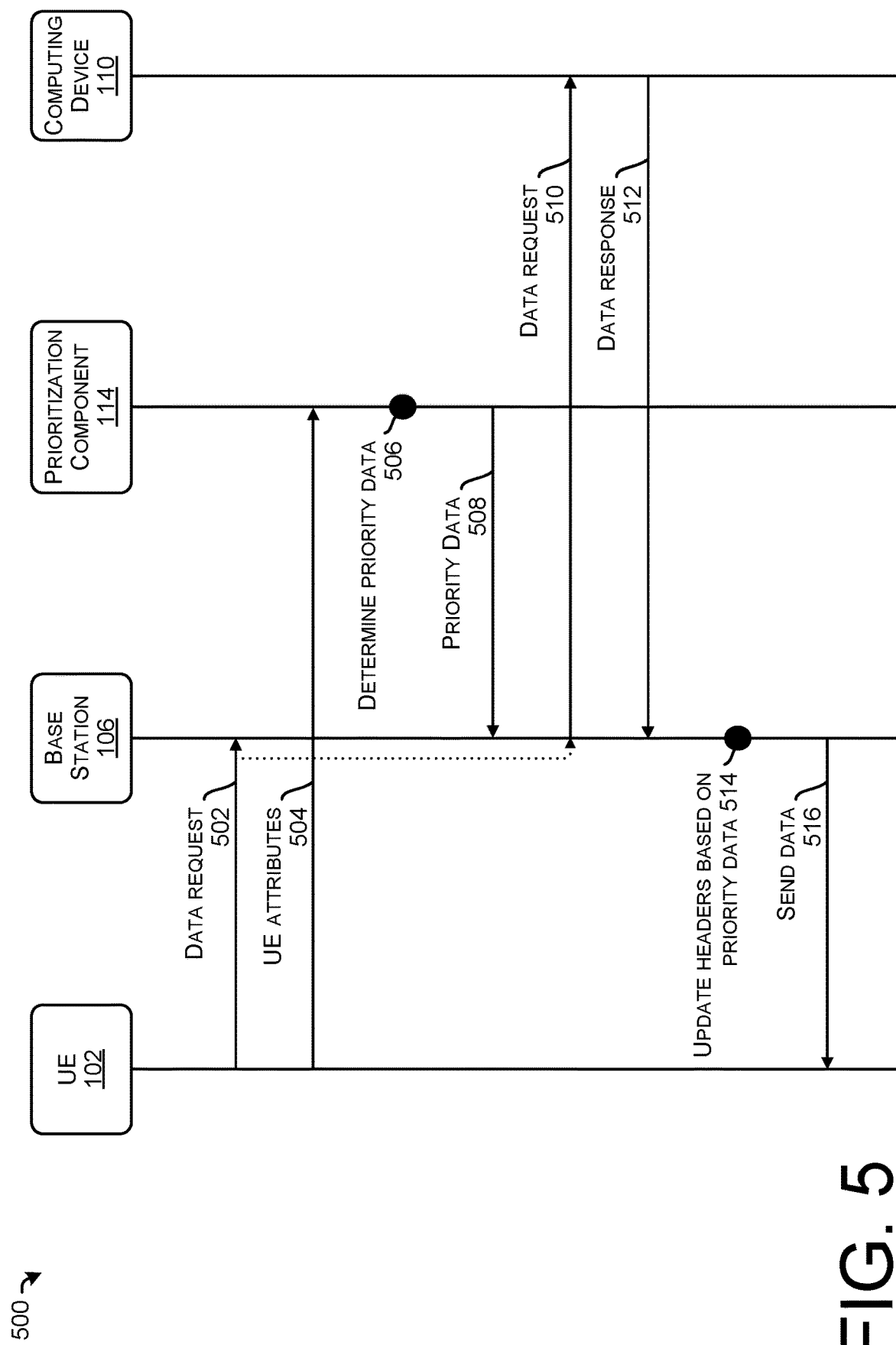
FIG. 5 shows a sequence diagram of example operations and messages for network-based data packet prioritization for downlink transmission.

FIG. 5 shows a sequence diagram 500 of example operations and messages for network-based data packet prioritization for downlink transmission.

The UE 102 can have an active connection between the UE 102 and the base station 106. In some examples, the connection can be a standalone connection or a dual connectivity connection.

At point 502, the UE can send a data request to the base station 106. At the same time or in connection with the data request 502, at point 504 the UE can send UE attributes to the prioritization component 114. In some examples, the UE attributes can include an application identifier associated with the data request 502, an IP address associated with the data request 502, an indication of whether the application is in a foreground or background, user preferences, and the like, as discussed herein. In some examples, the UE attributes can include a proposed priority level associated with the data request 502.

At point 506, the prioritization component 114 can determine priority data to be associated with the data request 502. In some examples, the prioritization component 114 can determine the priority data based at least in part on the UE attributes, network attributes, etc. For example, the prioritization component 114 use an application identifier associated with the data request 502 to look up a priority level in a database (or other data structure) to determine the priority data. In some examples, the prioritization component 114 can input UE attributes, network data, etc. into a machine learned model to determine a priority level associated with the data request 502.

At point 508, the prioritization component 114 can provide or otherwise send the priority data to the base station 106.

In some examples, the UE 102 may include the prioritization component 114, in which case the UE 102 would determine a priority level and include the priority level as data sent to the base station 106.

At point 510, the base station can forward the data request 502 or can send a data request based on the data request to the computing device 110. In this examples, the computing device 110 represents a data source associated with the data request 502.

At point 512, the computing device 110 can provide data in response to the data request(s) 502 and 510. The base station 106 can receive the data sent by the computing device.

At point 514 the base station 106 can update headers (or a portion of a header) associated with the data response 512 based on the priority data 508. In some examples, a PDCP layer of the base station 106 can update a header of a data packet, add a tag to a data packet, or otherwise associated data packets with a priority level, as discussed herein. In some examples, data packets can be associated with a priority level by assigning the data packets to a particular transmission queue associated with the priority level.

At point 516, the base station 106 can send the data to the UE 102 in accordance with the priority level. In some examples, sending the data from the base station 106 to the UE 102 can include sending data packets prioritized in the PDCP layer to other layers of the radio protocol stack for subsequent transmission to the UE 102.

FIG. 5 accordingly shows operations and messages in a situation in which network-based prioritization of downlink data transmission is implemented in a network. In some examples, aspects of FIG. 5 can be performed in parallel or multiple times in connection with each data request associated with a UE. That is, in some examples, multiple priority levels can be determined for a single UE and various priority levels can be determined for respective data. Accordingly, the described techniques enhance network functionality and user experience by customizing the transmission of data to provide the most appropriate performance characteristics for any particular application or customer.

Figure 6:
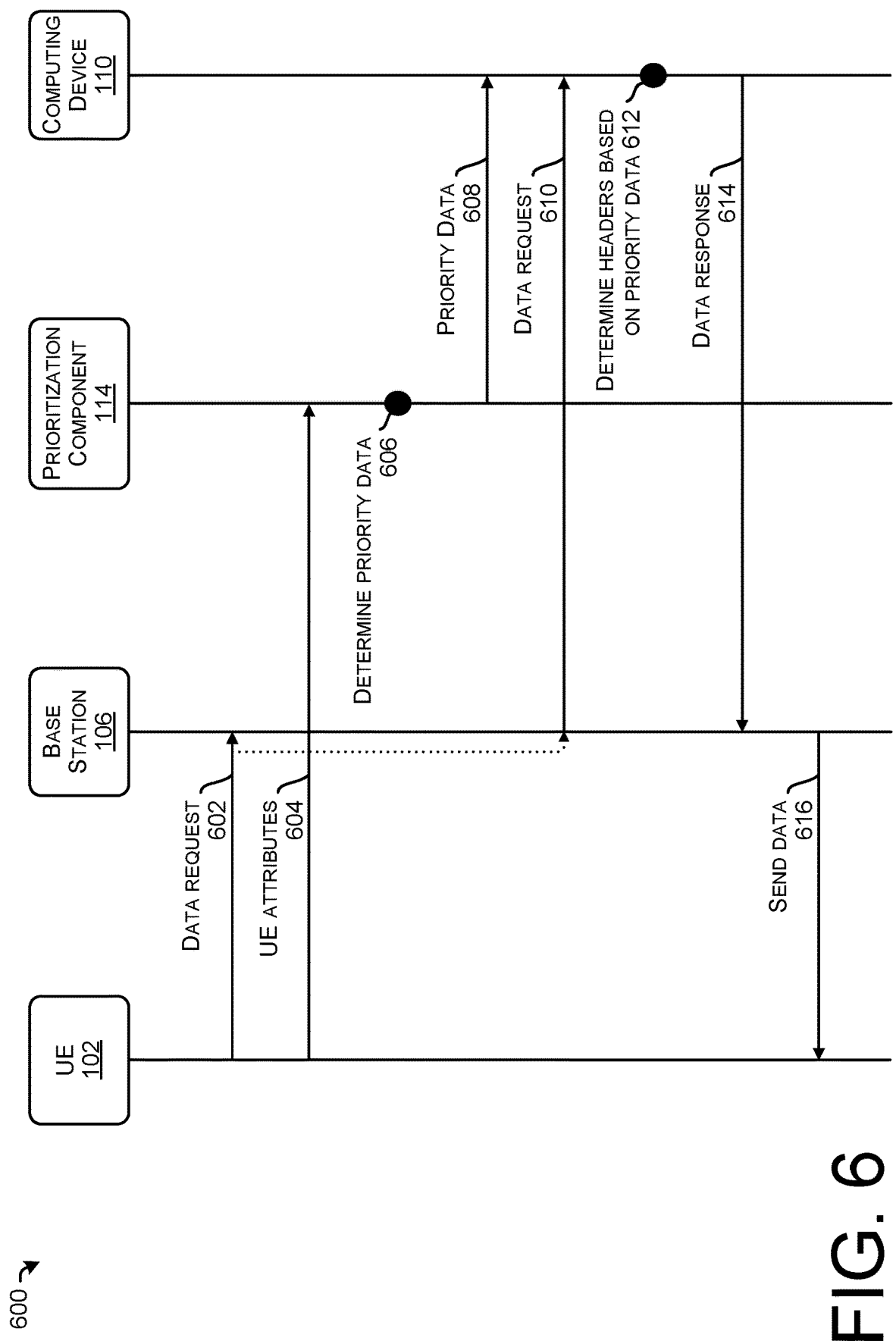
FIG. 6 shows a sequence diagram of example operations and messages for sender-based data packet prioritization for downlink transmission.

FIG. 6 shows a sequence diagram 600 of example operations and messages for sender-based data packet prioritization for downlink transmission.

The UE 102 can have an active connection between the UE 102 and the base station 106. In some examples, the connection can be a standalone connection or a dual connectivity connection.

At point 602, the UE can send a data request to the base station 106. At the same time or in connection with the data request 602, at point 604 the UE can send UE attributes to the prioritization component 114. In some examples, the UE attributes can include an application identifier associated with the data request 602, an IP address associated with the data request 602, an indication of whether the application is in a foreground or background, user preferences, and the like, as discussed herein. In some examples, the UE attributes can include a proposed priority level associated with the data request 602.

At point 606, the prioritization component 114 can determine priority data to be associated with the data request 602. In some examples, the prioritization component 114 can determine the priority data based at least in part on the UE attributes, network attributes, etc. For example, the prioritization component 114 use an application identifier associated with the data request 602 to look up a priority level in a database (or other data structure) to determine the priority data. In some examples, the prioritization component 114 can input UE attributes, network data, etc. into a machine learned model to determine a priority level associated with the data request 602.

At point 608, the prioritization component 114 can provide or otherwise send the priority data to the computing device 110. In some examples, the priority data 608 can comprise a unique code or identifier that is seemingly an arbitrary tag or code such that data packets associated with the unique code or identifier can be decoded or translated into a priority level by the base station 106. In such an example, the prioritization component 114 can send an indication of the priority data, unique code, or identifier to the base station 106 so that the base station 106 can decode, tag, or otherwise associate particular data packets with a particular priority level.

In some examples, the UE 102 may include the prioritization component 114, in which case the UE 102 would determine a priority level and include the priority level as data sent to the computing device 110.

At point 610, the base station 106 can forward the data request 602 or can send a data request based on the data request 602 to the computing device 110. In this example, the computing device 110 represents a data source associated with the data request 602.

At point 612 the computing device 110 can generate headers for data packets to be sent in response to the data request 602. In some examples, the headers can be a field of a TCP/IP data packet header. In some examples, the computing device 110 can associate data packets with an identifier that can be used by the base station 106 to determine a priority level associated with the data packets responsive to the data request 610.

At point 614, the computing device 110 can provide data to the base station 106 in response to the data request(s) 602 and 610. The base station 106 can receive the data sent by the computing device 110.

In some examples, a PDCP layer of the base station 106 can receive the data sent in the data response 610 and can further update a header of a data packet, add a tag to a data packet, or otherwise associated data packets with a priority level, as discussed herein. In some examples, data packets can be associated with a priority level by assigning the data packets to a particular transmission queue associated with the priority level.

At point 616, the base station 106 can send the data to the UE 102 in accordance with the priority level. In some examples, sending the data from the base station 106 to the UE 102 can include sending data packets prioritized in the PDCP layer to other layers of the radio protocol stack for subsequent transmission to the UE 102.

FIG. 6 accordingly shows operations and messages in a situation in which sender-based prioritization of downlink data transmission is implemented in a network. In some examples, aspects of FIG. 6 can be performed in parallel or multiple times in connection with each data request associated with a UE. That is, in some examples, multiple priority levels can be determined for a single UE and various priority levels can be determined for respective data. Accordingly, the described techniques enhance network functionality and user experience by customizing the transmission of data to provide the most appropriate performance characteristics for any particular application or customer.

Figure 7:
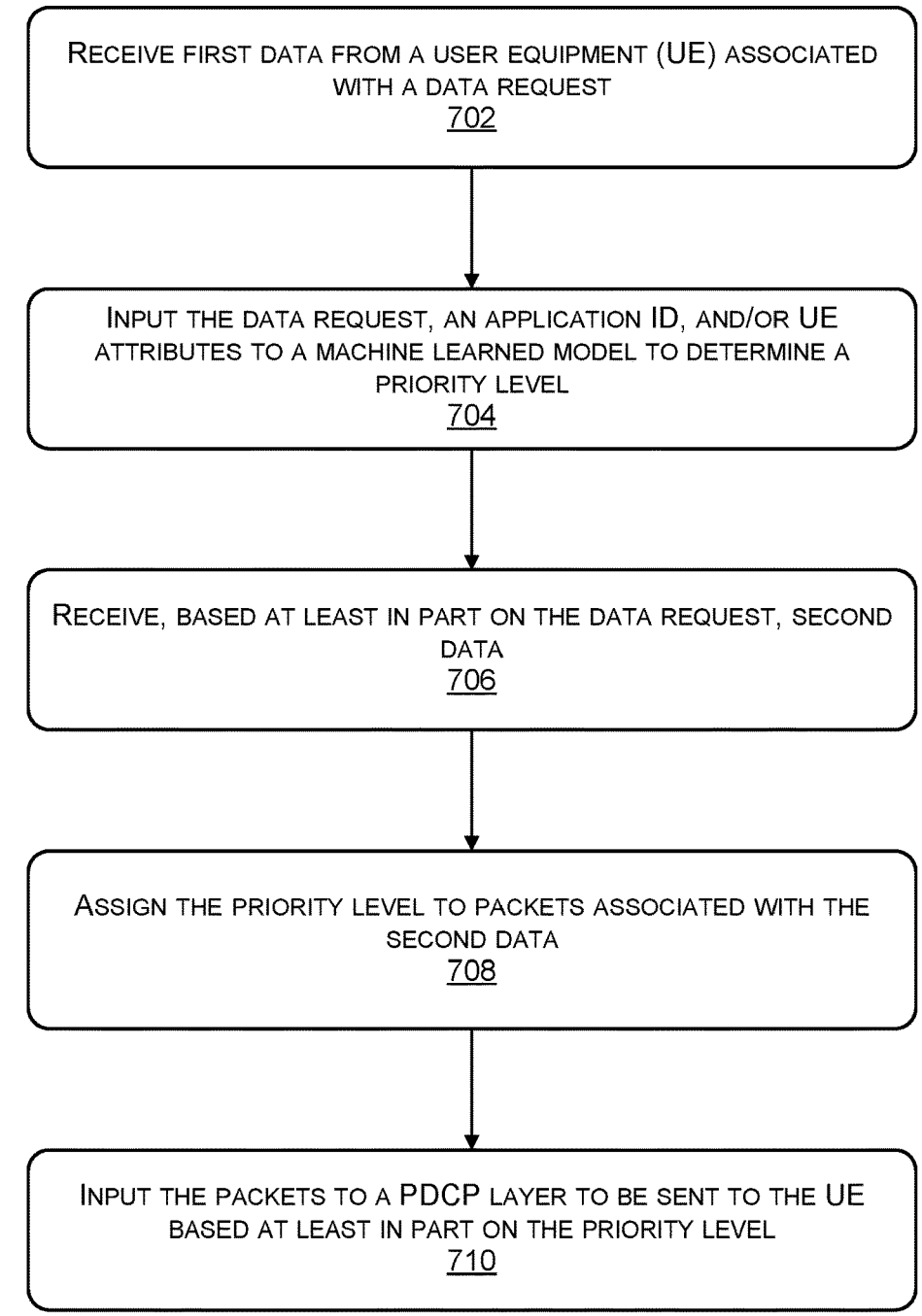
FIG. 7 illustrates an example process for network-based data packet prioritization for downlink transmission.

FIG. 7 illustrates an example process 700 for network-based data packet prioritization for downlink transmission. The example process 700 can be performed (at least in part) by the base station 106, the computing devices 108 and 110, or by any device comprising the prioritization component 114, as discussed herein.

At operation 702, the process can include receiving first data from a user equipment (UE), wherein the first data is associated with a data request. In some examples, the first data can include UE attributes, as discussed herein, although in some examples, the UE attributes can be sent separate from the data request.

At operation 704, the process can include inputting the data request, an application ID, and/or UE attributes to a machine learned model to determine a priority level. As discussed herein, the priority level is to be used in prioritizing downlink data transmissions from a base station to the UE. The priority level can be based on an application identifier, whether an application is in a foreground or background, deep packet inspection including a determining regarding a type of data that is included in a payload portion of a data packet, user preferences, network data and conditions, and the like.

At operation 706, the process can include receiving, based at least in part on the data request, second data. For example, if the data request is associated with a content stream, such as music or video, the second data can include the audio data or the video data. If the data request is in connection with a gaming application, the second data can comprise a next frame or updated state information associated with the gaming application. As can be understood, virtually any type of data can be provided in response to a data request, and the examples discussed herein are not intended to be exhaustive or limiting.

At operation 708, the process can include assigning the priority level to packets associated with the second data. In this network-based prioritization implementation, a base station, or a PDCP layer of the radio protocol stack, can assigning the priority level to packets by updating a header, a tag, or otherwise associating the data packets with a priority level.

At operation 710, the process can include inputting the packets to a PDCP layer to be sent to the UE based at least in part on the priority level. In some examples, the priority level can be determined by the PDCP layer or by inputting the data packets to a particular queue associated with a priority level. In such examples, the operation 710 can include forwarding, providing, or otherwise sending the data packets associated with a priority level to other layers of the radio protocol stack, such as an RLC layer, a MAC layer, or a PHY layer, as discussed herein.

Figure 8:
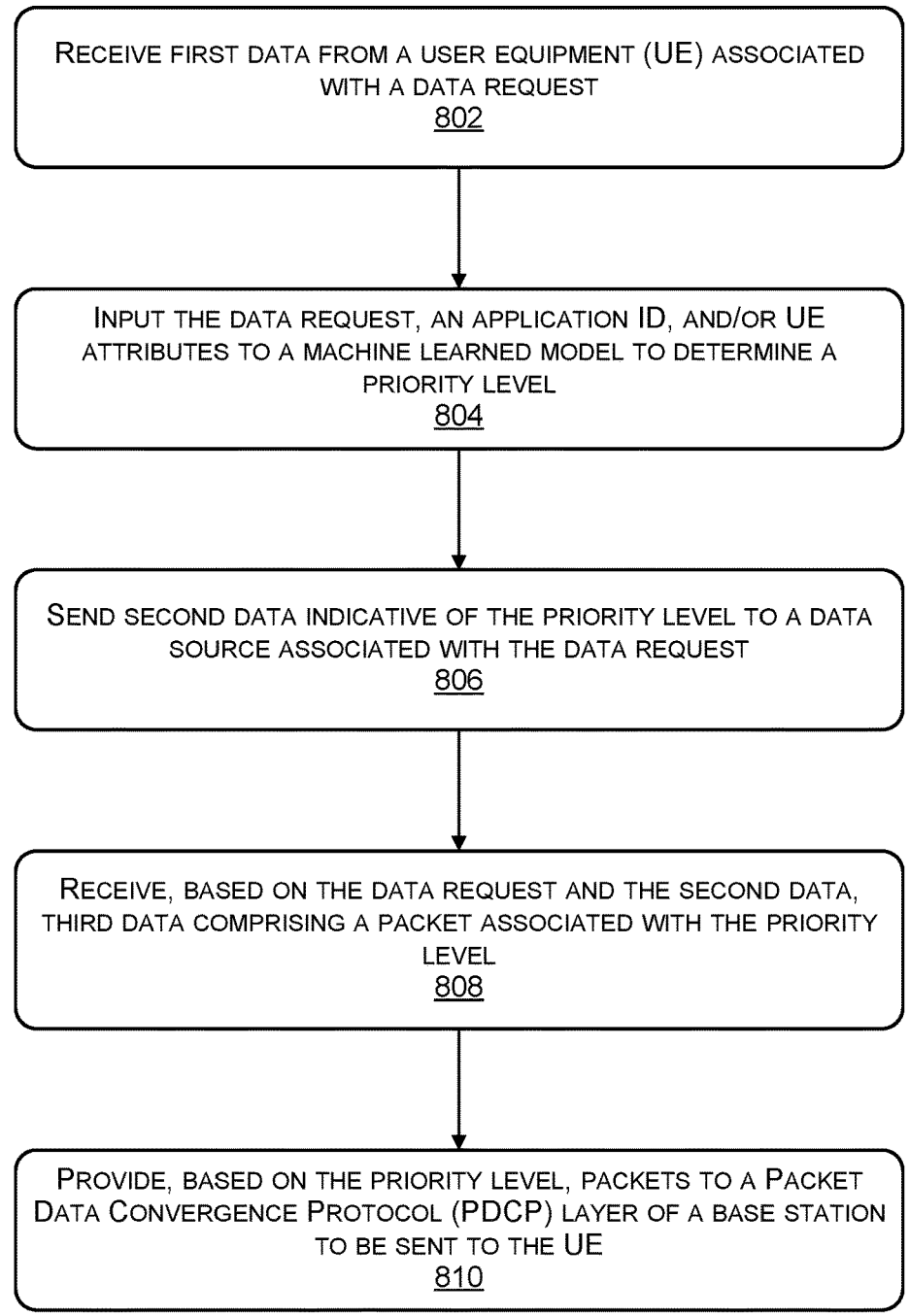
FIG. 8 illustrates an example process for sender-based data packet prioritization for downlink transmission.

FIG. 8 illustrates an example process 800 for sender-based data packet prioritization for downlink transmission. The example process 800 can be performed (at least in part) by the base station 106, the computing devices 108 and 110, or by any device comprising the prioritization component 114, as discussed herein.

At operation 802, the process can include receiving first data from a user equipment (UE), wherein the first data is associated with a data request. In some examples, the first data can include UE attributes, as discussed herein, although in some examples, the UE attributes can be sent separate from the data request.

At operation 804, the process can include inputting the data request, an application ID, and/or UE attributes to a machine learned model to determine a priority level. As discussed herein, the priority level is to be used in prioritizing downlink data transmissions from a base station to the UE. The priority level can be based on an application identifier, whether an application is in a foreground or background, deep packet inspection including a determining regarding a type of data that is included in a data packet, user preferences, network data and conditions, and the like.

At operation 806, the process can include sending second data indicative of the priority level to a data source associated with the data request. In some examples, the priority data can comprise a unique code or identifier that is seemingly an arbitrary tag or code such that data packets associated with the unique code or identifier can be decoded or translated into a priority level when received by a base station.

At operation 808, the process can include receiving, based on the data request and the second data, third data comprising a packet associated with the priority level. As noted above, in some examples, data packets from a data source can be encoded, tagged, or associated with a header indicative of a unique code or identifier that may be decoded, converted, or otherwise transformed to a priority level after such data is received by a base station.

At operation 810, the process can include providing, based on the priority level, packets to a Packet Data Convergence Protocol (PDCP) layer of a base station to be sent to the UE. In some examples, the priority level can be determined by the PDCP layer or by inputting the data packets to a particular queue associated with a priority level. In such examples, the operation 810 can include forwarding, providing, or otherwise sending the data packets associated with a priority level to other layers of the radio protocol stack, such as an RLC layer, a MAC layer, or a PHY layer, as discussed herein.

Figure 9:
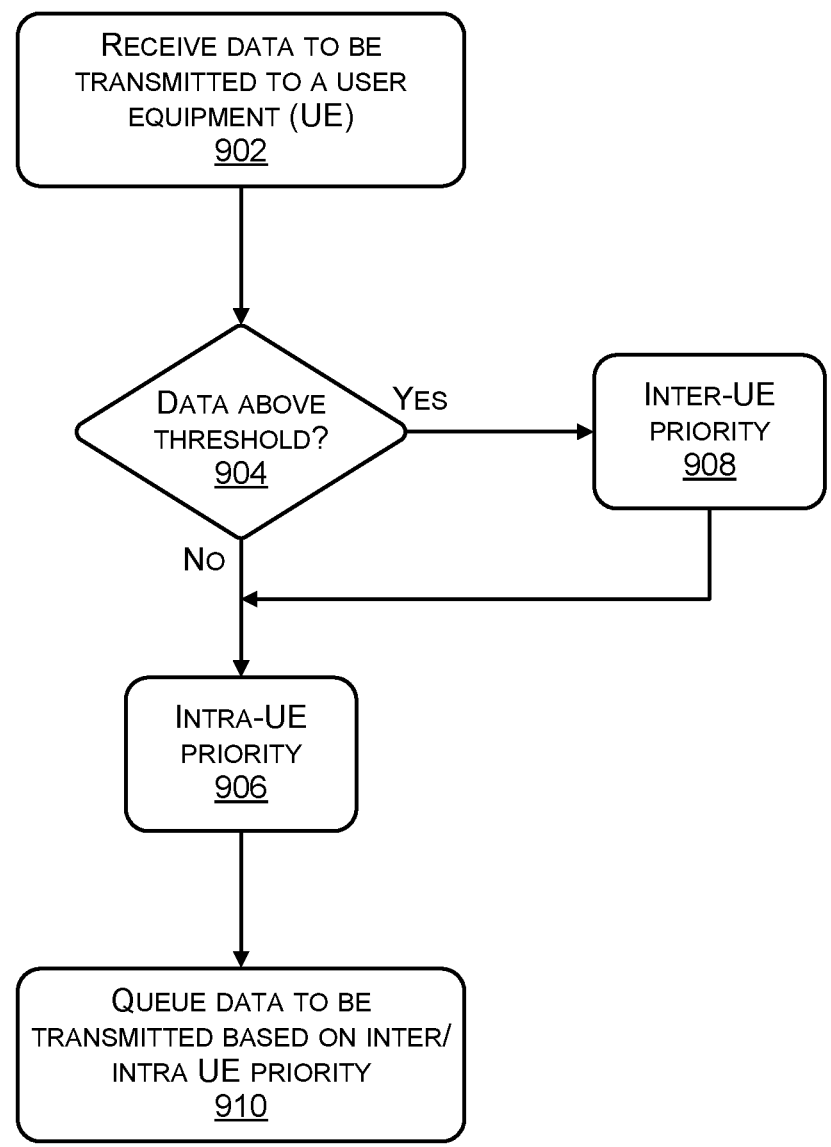
FIG. 9 illustrates an example process for implementing inter-UE downlink data prioritization and/or intra-UE downlink data prioritization.

FIG. 9 illustrates an example process 900 for implementing inter-UE downlink data prioritization and/or intra-UE downlink data prioritization. The example process 900 can be performed (at least in part) by the base station 106, the computing devices 108 and 110, or by any device comprising the prioritization component 114, as discussed herein.

At operation 902, the process can include receiving data to be transmitted to a user equipment (UE). In some examples, the operation can be in response to a data request sent from a UE to a data source. In some examples, a priority level can be associated with the data packets using the network-based prioritization or the sender-based prioritization, as discussed herein.

At operation 904, the process can include determining whether data to be sent from a base station or other access point is above a threshold. In some examples, the operation 904 can include determining whether the base station is experiencing congestion or is otherwise limited with respect to some capability. For example, the operation 904 can include determining whether a latency is above a threshold, whether a packet error loss is above a threshold, and the like. If the data (or other metric) is not above the threshold ("no" in the operation 904), the process can continue to operation 906. Such a "no" determination in the operation 904 may be indicative of an uncongested or unrestricted transmission interval or time period associated with a base station.

At operation 906, the process can include implementing intra-UE priority. In some examples, such intra-UE priority corresponds to prioritizing data packets relative to other data packets addressed to the same UE. That is, intra-UE priority can include prioritizing data to a UE associated with multiple data requests, as discussed herein.

If the data (or other metric is not above the threshold ("yes" in the operation 904), the process can continue to operation 908. Such a "yes" determination in the operation 904 may be indicative of a congested or restricted state associated with a base station, or other conditions that transmission resources to a UE are limited.

At operation 908, the process can include implementing inter-UE priority. In some examples, such inter-UE priority corresponds to prioritizing data packets relative to other data packets addressed to other UEs. The process can continue to the operation 906 to implement intra-UE priority in addition to inter-UE priority.

Although not illustrated in the flow of FIG. 9, in some examples, inter-UE priority may be implemented without implementing intra-UE priority where by downlink data to be transmitted to a UE is transmitted based on an order that data packets are received by a base station (and any default priority levels).

At operation 910, the process can include queuing data to be transmitted based on the inter/intra UE priority, as discussed herein. Accordingly, the described techniques enhance network functionality and user experience by customizing the transmission of data to provide the most appropriate performance characteristics for any particular application or customer either between data associated with a single UE or between data to be transmitted to a plurality of UEs.

Example Clauses

A: A method comprising: receiving, from a user equipment (UE), first data associated with a data request; determining, based at least in part on the data request, a Quality of Service Class Identifier (QCI) associated with the data request; inputting the first data into a model to determine a priority level associated with the data request; receiving, based at least in part on the data request, second data from a data source; assigning the QCI and the priority level to packets associated with the second data; and providing the packets associated with the QCI and the priority level to a Packet Data Convergence Protocol (PDCP) layer of a base station, wherein the base station sends at least a portion of the packets to the UE in accordance with the QCI and the priority level.

B: The method of paragraph A, wherein the model is a machine learned model trained to determine the priority level based at least in part on attributes associated with the UE and on the data source.

C: The method of paragraph A or B, wherein the first data comprises an application identifier and an indication of whether an application associated with the application identifier is in a foreground or a background associated with the UE.

D: The method of any of paragraphs A-C, wherein the first data comprises an indication received via a user interface associated with the UE, wherein the indication comprises at least one user preference.

E: The method of any of paragraphs A-D, wherein: the data request is a first request, the priority level is a first priority level, the data source is a first data source, the packets are first packets, and the method further comprising: receiving, from the UE, third data associated with a second data request; determining that the second data request is associated with the QCI; inputting the third data into the model to determine a second priority level associated with the second data request; receiving, based at least in part on the second data request, fourth data from a second data source; assigning the QCI and the second priority level to second packets associated with the fourth data; and providing the second packets associated with the QCI and the second priority level to PDCP layer of the base station, wherein the base station sends the second packets to the UE in accordance with the QCI and the second priority level.

F: The method of paragraph E, wherein the second packets are prioritized over the first packets based at least in part on the first priority level and the second priority level.

G: The method of any of paragraphs A-F, further comprising: determining the priority level based at least in part on a payload portion of a packet associated with the second data.

H: The method of any of paragraphs A-G, wherein: the packets are first packets; the UE is a first UE; and the priority level prioritizes the first packets with respect to second packets associated with a second UE.

I: The method of any of paragraphs A-H, wherein: the packets are first packets associated with the UE; and the priority level prioritizes the first packets with respect to second packets associated with the UE.

J: A system comprising: one or more processors; and one or more non-transitory computer-readable media storing computer-executable instructions that, when executed, cause the one or more processors to perform operations comprising: receiving, from a user equipment (UE), first data associated with a data request; determining, based at least in part on the data request, a Quality of Service Class Identifier (QCI) associated with the data request; inputting the first data into a model to determine a priority level associated with the data request; receiving, based at least in part on the data request, second data from a data source; assigning the QCI and the priority level to packets associated with the second data; and providing the packets associated with the QCI and the priority level to a Packet Data Convergence Protocol (PDCP) layer of a base station, wherein the base station sends at least a portion of the packets to the UE in accordance with the QCI and the priority level.

K: The system of paragraph J, wherein the model is a machine learned model trained to determine the priority level based at least in part on attributes associated with the UE and on the data source.

L: The system of paragraph J or K, wherein the first data comprises an application identifier and an indication of whether an application associated with the application identifier is in a foreground or a background associated with the UE.

M: The system of any of paragraphs J-L, the operations further comprising: determining the priority level based at least in part on a payload portion of a packet associated with the second data.

N: The system of any of paragraphs J-M, wherein: the packets are first packets; the UE is a first UE; and the priority level prioritizes the first packets with respect to second packets associated with a second UE.

O: The system of paragraph N, wherein: wherein the first packets and the second packets are associated with a same Quality of Service (QoS) Class Identifier (QCI).

P: The system of any of paragraphs J-O, wherein: the packets are first packets associated with the UE; and the priority level prioritizes the first packets with respect to second packets associated with the UE.

Q: One or more non-transitory computer-readable media storing computer-executable instructions that, when executed, cause one or more processors to perform operations comprising: receiving first data from a user equipment (UE), the first data associated with a data request; inputting at least one of the data request, an application identifier associated with the data request, or attribute data associated with the UE to a machine learned model; receiving, from the machine learned model, a priority level associated with the data request; receiving, based at least in part on the data request, second data; updating, based at least in part on the priority level, a header associated with a packet of the second data; and inputting the packet to a Packet Data Convergence Protocol (PDCP) layer of a base station to send the packet to the UE.

R: The one or more non-transitory computer-readable media of paragraph Q, the operations further comprising: receiving, from the UE, the application identifier and the attribute data; and inputting the data request, the application identifier, and the attribute data to the machine learned model; wherein the priority level is based at least in part on the data request, the application identifier, and the attribute data.

S: The one or more non-transitory computer-readable media of paragraph R, wherein the attribute data is based at least in part on an indication from a user.

T: The one or more non-transitory computer-readable media of any of paragraphs Q-S, wherein: the packet is a first packet; the UE is a first UE; the priority level prioritizes the first packet with respect to a second packet associated with a second UE; and the first packet and the second packet are associated with a same Quality of Service (QoS) Class Identifier (QCI).

U: A method comprising: receiving, from a user equipment (UE), first data associated with a data request; determining, based at least in part on the data request, a Quality of Service Class Identifier (QCI) associated with the data request; inputting the first data into a model to determine a priority level associated with the data request; sending second data indicative of the priority level to a data source associated with the data request; receiving, based at least in part on the second data and the data request, third data from the data source, the third data comprising a packet with a header portion comprising an indication of the priority level; and providing, based at least in part on the priority level, packets associated with the third data to a Packet Data Convergence Protocol (PDCP) layer of a base station, wherein the base station sends the packets to the UE in accordance with the QCI and the priority level.

V: The method of paragraph U, further comprising: establishing, based at least in part on the QCI, a bearer associated with the UE; and providing the packets to the PDCP layer further based at least in part on the QCI.

W: The method of paragraph U or V, wherein the model is a machine learned model trained to determine the priority level based at least in part on attributes associated with the UE and on the data source.

X: The method of any of paragraphs U-W, wherein the first data comprises an application identifier and an indication of whether an application associated with the application identifier is in a foreground or a background associated with the UE.

Y: The method of any of paragraphs U-X, wherein the first data comprises an indication received via a user interface associated with the UE, wherein the indication comprises at least one user preference.

Z: The method of any of paragraphs U-Y, wherein: the data request is a first request, the priority level is a first priority level, the data source is a first data source, the packet is a first packet, the header portion is a first header portion, the packets are first packets, and the method further comprising: receiving, from the UE, fourth data associated with a second data request; determining that the second data request is associated with the QCI; inputting the fourth data into the model to determine a second priority level associated with the second data request; sending fifth data indicative of the second priority level to a second data source associated with the second data request; receiving, based at least in part on the fifth data and the second data request, sixth data from the second data source, the sixth data comprising a second packet with a second header portion comprising an indication of the second priority level; and providing, based at least in part on the second priority level, second packets associated with the sixth data to the PDCP layer of the base station, wherein the base station sends the second packets to the UE in accordance with the QCI and the second priority level.

AA: The method of paragraph Z, wherein the second packets are prioritized over the first packets based at least in part on the first priority level and the second priority level.

AB: The method of any of paragraphs U-AA, wherein providing the packets associated with the third data to the PDCP layer overrides a default priority level associated with the QCI.

AC: A system comprising: one or more processors; and one or more non-transitory computer-readable media storing computer-executable instructions that, when executed, cause the one or more processors to perform operations comprising: receiving, from a user equipment (UE), first data associated with a data request; determining, based at least in part on the data request, a Quality of Service Class Identifier (QCI) associated with the data request; inputting the first data into a model to determine a priority level associated with the data request; sending second data indicative of the priority level to a data source associated with the data request; receiving, based at least in part on the second data and the data request, third data from the data source, the third data comprising a packet with a header portion comprising an indication of the priority level; and providing, based at least in part on the priority level, packets associated with the third data to a Packet Data Convergence Protocol (PDCP) layer of a base station, wherein the base station sends the packets to the UE in accordance with the QCI and the priority level.

AD: The system of paragraph AC, the operations further comprising: establishing, based at least in part on the QCI, a bearer associated with the UE; and providing the packets to the PDCP layer further based at least in part on the QCI.

AE: The system of paragraph AC or AD, wherein the model is a machine learned model trained to determine the priority level based at least in part on attributes associated with the UE and on the data source.

AF: The system of any of paragraphs AC-AE, wherein the first data further comprises an application identifier.

AG: The system of paragraph AF, wherein the first data further comprises an indication of whether an application associated with the application identifier is in a foreground or a background associated with the UE.

AH: The system of any of paragraphs AC-AG, wherein providing the packets associated with the third data to the PDCP layer overrides a default priority level associated with the QCI.

AI: The system of any of paragraphs AC-AH, wherein: the packets are first packets; the base station is a first base station; the PDCP layer is a first PDCP layer; and the operations further comprise: sending second packets associated with the third data to a second PDCP layer of a second base station to be transmitted by the second base station to the UE.

AJ: The system of any of paragraphs AC-AI, wherein: the packets are first packets associated with the UE; and the priority level prioritizes the first packets with respect to second packets associated with the UE.

AK: One or more non-transitory computer-readable media storing computer-executable instructions that, when executed, cause one or more processors to perform operations comprising: receiving first data from a user equipment (UE), the first data associated with a data request; inputting at least one of the data request, an application identifier associated with the data request, or attribute data associated with the UE to a machine learned model; receiving, from the machine learned model, a priority level associated with the data request; sending second data indicative of the priority level to a data source associated with the data request; receiving, based at least in part on the data request and the second data, third data comprising a packet associated with the priority level; and providing, based at least in part on the priority level, packets to a Packet Data Convergence Protocol (PDCP) layer of a base station to be sent to the UE.

AL: The one or more non-transitory computer-readable media of paragraph AK, the operations further comprising: receiving, from the UE, the application identifier and the attribute data; and inputting the data request, the application identifier, and the attribute data to the machine learned model; wherein the priority level is based at least in part on the data request, the application identifier, and the attribute data.

AM: The one or more non-transitory computer-readable media of paragraph AK or AL, wherein the priority level is associated with at least one of a downlink data rate, a delay budget, or a packet error loss rate.

AN: The one or more non-transitory computer-readable media of any of paragraphs AK-AM, the operations further comprising: determining that a congestion level meets or exceeds a threshold level; and providing the packets to the PDCP layer based at least in part on the congestion level meeting or exceeding the threshold level.

While the example clauses described above are described with respect to one particular implementation, it should be understood that, in the context of this document, the content of the example clauses can also be implemented via a method, device, system, computer-readable medium, and/or another implementation. Additionally, any of examples A-AN may be implemented alone or in combination with any other one or more of the examples A-AN.

While the example clauses described above are described with respect to one particular implementation, it should be understood that, in the context of this document, the content of the example clauses can also be implemented via a method, device, system, computer-readable medium, and/or another implementation. Additionally, any of examples A-AN may be implemented alone or in combination with any other one or more of the examples A-AN.

CONCLUSION

Although features and/or methodological acts are described above, it is to be understood that the appended claims are not necessarily limited to those features or acts. Rather, the features and acts described above are disclosed as example forms of implementing the claims.

What is claimed is:

1. A method comprising:
   receiving, from a user equipment (UE), first data associated with a first data request;
   determining, based at least in part on the first data request, a Quality of Service Class Identifier (QCI) associated with the first data request;
   inputting the first data into a model to determine a first priority level associated with the first data request;
   forwarding the first data request to a first data source in response to receiving information on the first priority level;
   receiving, based at least in part on the first data request, second data from the first data source;
   assigning the QCI and the first priority level to first packets associated with the second data;
   providing the first packets associated with the QCI and the first priority level to a Packet Data Convergence Protocol (PDCP) layer of a base station, wherein the base station sends at least a portion of the first packets to the UE in accordance with the QCI and the first priority level;

receiving, from the UE, third data associated with a second data request;

determining that the second data request is associated with the QCI, with both the first data request and the second data request associated with the same QCI;

inputting the third data into the model to determine a second priority level associated with the second data request, wherein the second priority level is different from the first priority level;

receiving, based at least in part on the second data request, fourth data from a second data source;

assigning the QCI and the second priority level to second packets associated with the fourth data; and providing the second packets associated with the QCI and the second priority level to PDCP layer of the base station, wherein the base station sends the second packets to the UE in accordance with the QCI and the second priority level, wherein the model is a machine learned model trained to determine the first priority level based at least in part on attributes associated with the UE and on the first data source and the second priority level based at least in part on attributes associated with the UE and the second data source, and wherein the attributes associated with the UE include at least user preferences or an indication of a user interface of a service displayed on the UE.

2. The method of claim 1, wherein the first data comprises an application identifier and an indication of whether an application associated with the application identifier is in a foreground or a background associated with the UE.

3. The method of claim 1, wherein the first data comprises an indication received via a user interface associated with the UE, wherein the indication comprises at least one user preference.

4. The method of claim 1, wherein the second packets are prioritized over the first packets based at least in part on the first priority level and the second priority level.

5. The method of claim 1, further comprising: determining the first priority level based at least in part on a payload portion of a packet associated with the second data.

6. The method of claim 1, wherein: the UE is a first UE; and the first priority level prioritizes the first packets with respect to third packets associated with a second UE.

7. The method of claim 1, wherein: the first priority level prioritizes the first packets with respect to second packets associated with the UE.

8. A system comprising:
one or more processors; and
one or more non-transitory computer readable media storing computer executable instructions that, when executed, cause the one or more processors to perform operations comprising:
receiving, from a user equipment (UE), first data associated with a first data request;
determining, based at least in part on the first data request, a Quality of Service Class Identifier (QCI) associated with the first data request;
inputting the first data into a model to determine a first priority level associated with the first data request;
forwarding the first data request to a first data source in response to receiving information on the first priority level;
receiving, based at least in part on the first data request, second data from the first data source;
assigning the QCI and the first priority level to packets associated with the second data;

providing the packets associated with the QCI and the first priority level to a Packet Data Convergence Protocol (PDCP) layer of a base station, wherein the base station sends at least a portion of the packets to the UE in accordance with the QCI and the first priority level, receiving, from the UE, third data associated with a second data request;

determining that the second data request is associated with the QCI, with both the first data request and the second data request associated with the same QCI;

inputting the third data into the model to determine a second priority level associated with the second data request, wherein the second priority level is different from the first priority level;

receiving, based at least in part on the second data request, fourth data from a second data source;

assigning the QCI and the second priority level to second packets associated with the fourth data; and providing the second packets associated with the QCI and the second priority level to PDCP layer of the base station, wherein the base station sends the second packets to the UE in accordance with the QCI and the second priority level, wherein the model is a machine learned model trained to determine the first priority level based at least in part on attributes associated with the UE and on the first data source and the second priority level based at least in part on attributes associated with the UE and the second data source, and wherein the attributes associated with the UE include at least user preferences or an indication of a user interface of a service displayed on the UE.

9. The system of claim 8, wherein the first data comprises an application identifier and an indication of whether an application associated with the application identifier is in a foreground or a background associated with the UE.

10. The system of claim 8, the operations further comprising: determining the first priority level based at least in part on a payload portion of a packet associated with the second data.

11. The system of claim 8, wherein: the packets are first packets; the UE is a first UE; and the first priority level prioritizes the first packets with respect to packets associated with a second UE.

12. The system of claim 8, wherein: the packets are first packets associated with the UE; and the first priority level prioritizes the first packets with respect to the second packets associated with the UE.

13. One or more non-transitory computer readable media storing computer executable instructions that, when executed, cause one or more processors to perform operations comprising:
receiving first data from a user equipment (UE), the first data associated with a first data request;
inputting at least one of the first data request, an application identifier associated with the first data request, or attribute data associated with the UE to a machine learned model;
forwarding the first data request to a first data source in response to receiving information on the first priority level;
receiving, from the machine learned model, a first priority level associated with the first data request;
receiving, based at least in part on the first data request, second data;
updating, based at least in part on the first priority level, a header associated with a packet of the second data, wherein the first priority level prioritizes the packet with respect to another packet among second packets belonging to fourth data;

inputting the packet to a Packet Data Convergence Protocol (PDCP) layer of a base station to send the packet to the UE, receiving, from the UE, third data associated with a second data request;

determining that the second data request is associated with a Quality of Service (QoS) Class Identifier (QCI), with both the first data request and the second data request associated with the same QCI;

inputting the third data into the model to determine a second priority level associated with the second data request, wherein the second priority level is different from the first priority level;

receiving, based at least in part on the second data request, the fourth data from a second data source;

assigning the QCI and the second priority level to the second packets associated with the fourth data;

updating, based at least in part on the second priority level, a header associated with the another packet of the fourth data; and inputting the another packet into the PDCP layer of the based station to send the packet to the UE, wherein the machine learned model is trained to determine the first priority level based at least in part on attributes associated with the UE and on the first data source and the second priority level based at least in part on attributes associated with the UE and the second data source, and wherein the attributes associated with the UE include at least user preferences or an indication of a user interface of a service displayed on the UE.

14. The one or more non-transitory computer readable media of claim 13, the operations further comprising: receiving, from the UE, the application identifier and the attribute data; and inputting the first data request, the application identifier, and the attribute data to the machine learned model; wherein the first priority level is based at least in part on the first data request, the application identifier, and the attribute data.

15. The one or more non-transitory computer readable media of claim 14, wherein the attribute data is based at least in part on an indication from a user.

16. The one or more non-transitory computer readable media of claim 13, wherein: the packet is a first packet; the UE is a first UE; and the first priority level prioritizes the first packet with respect to a packet associated with a second UE.

* * * * *